Sept. 11, 1962        G. W. JORGENSEN        3,053,181
METHOD FOR CONTROLLING PRINT QUALITY FOR LITHOGRAPHIC PRESSES
Filed Oct. 30, 1958        4 Sheets-Sheet 1
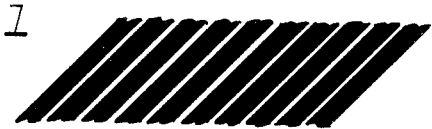
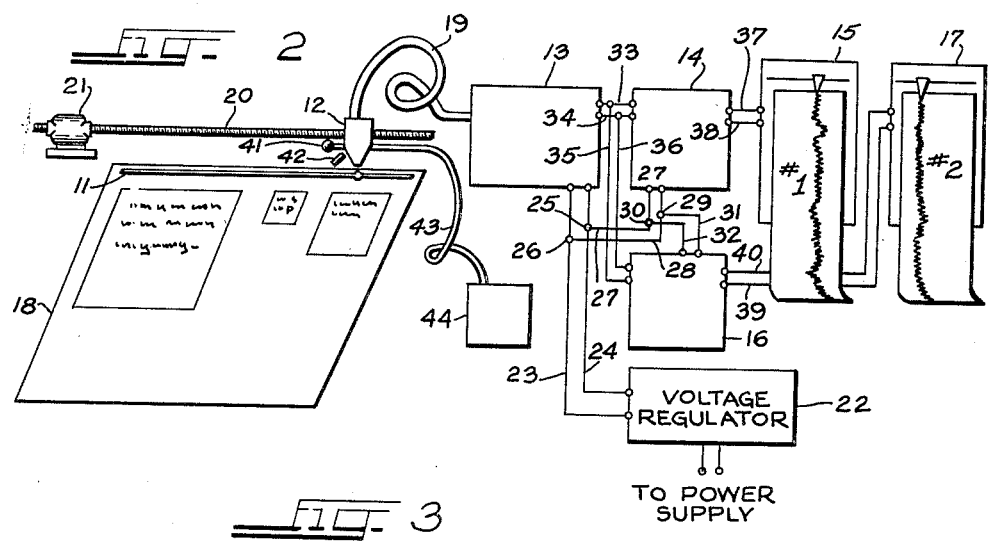
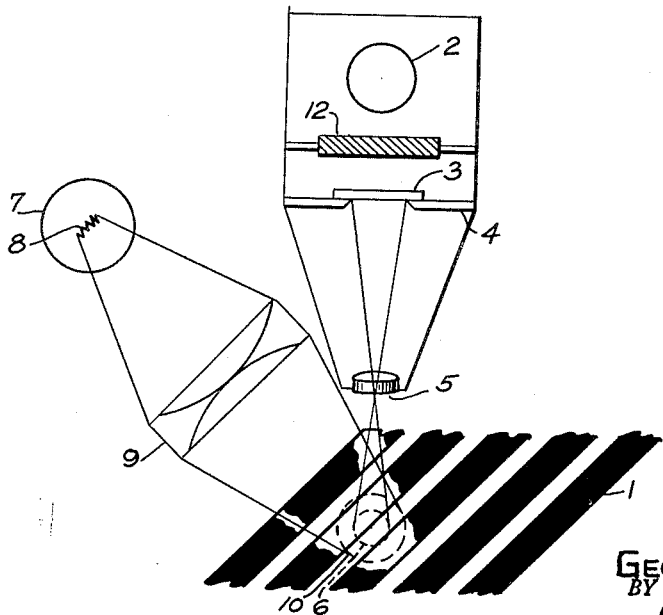
INVENTOR.
GEORGE W. JORGENSEN Sept. 11, 1962   G. W. JORGENSEN   3,053,181
METHOD FOR CONTROLLING PRINT QUALITY FOR LITHOGRAPHIC PRESSES
Filed Oct. 30, 1958   4 Sheets-Sheet 2

INVENTOR.
GEORGE W. JORGENSEN
BY
ATTYS.

Sept. 11, 1962   G. W. JORGENSEN   3,053,181
METHOD FOR CONTROLLING PRINT QUALITY FOR LITHOGRAPHIC PRESSES
Filed Oct. 30, 1958   4 Sheets-Sheet 3
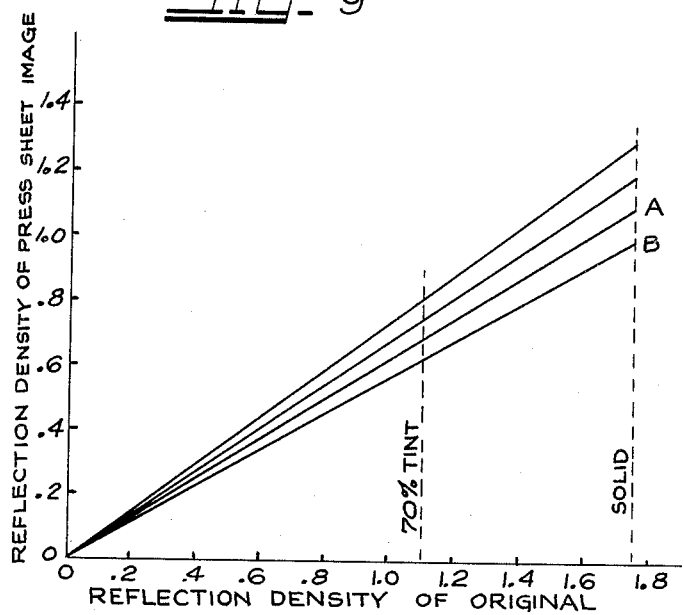
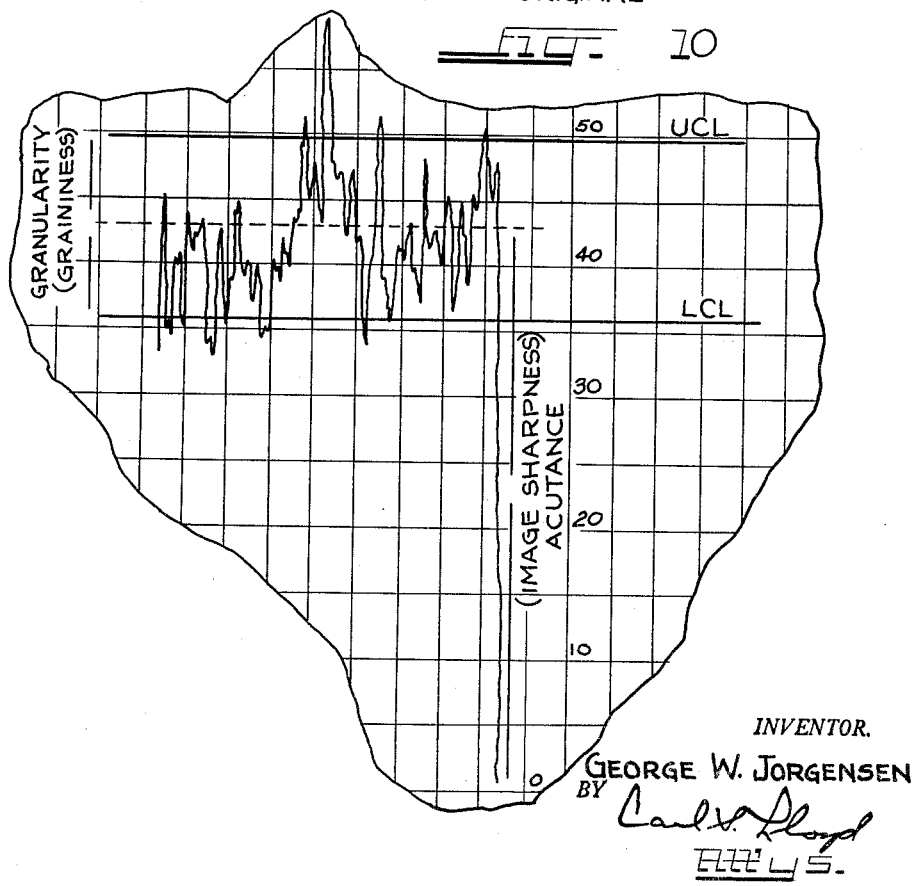
INVENTOR.
GEORGE W. JORGENSEN Sept. 11, 1962 G. W. JORGENSEN 3,053,181
METHOD FOR CONTROLLING PRINT QUALITY FOR LITHOGRAPHIC PRESSES
Filed Oct. 30, 1958 4 Sheets-Sheet 4
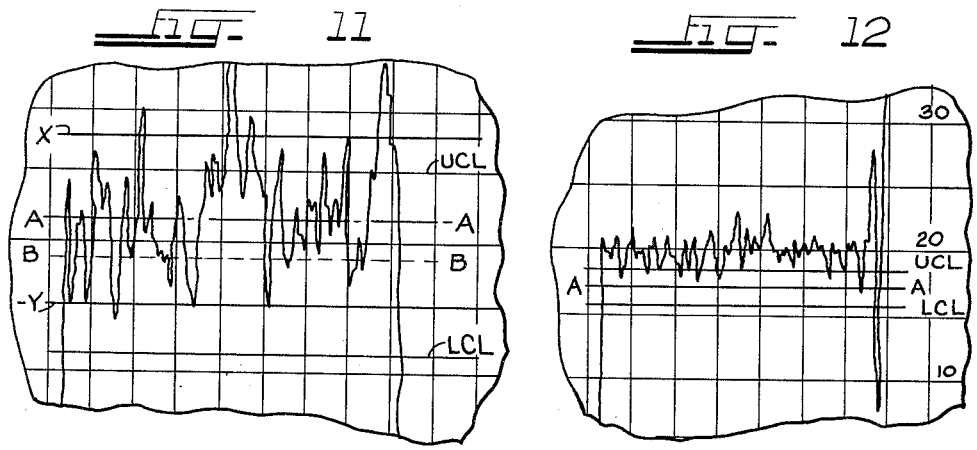
INVENTOR.
GEORGE W. JORGENSEN

3,053,181
METHOD FOR CONTROLLING PRINT QUALITY FOR LITHOGRAPHIC PRESSES
George W. Jorgensen, La Grange Park, Ill., assignor to Lithographic Technical Foundation, Chicago, Ill., a corporation of Delaware
Filed Oct. 30, 1958, Ser. No. 770,624
8 Claims. (Cl. 101—426)

This invention relates to a method of measuring the quality of halftone prints by measuring three of the factors which significantly affect said quality such that the measurements obtained will correspond closely to the measurements of quality made by an actual group of observers.

The term quality as here used refers to the fidelity with which the copy has been reproduced, that is, how closely the press sheet duplicates another press sheet which has been selected as the quality standard. Measurements of quality or of quality factors made by human observers are herein referred to as subjective measurements and measurements made by an instrument which does not require evaluation by human observers are herein referred to as objective measurements.

Some method of continuously measuring print quality during the operation of a lithographic press is necessary. At the beginning of the press run the problem is not serious since sample prints can be obtained and examined by the foreman and other officials with authority to approve them. Also the sample prints can be sent to the client for his approval. When such prints are deemed satisfactory by approval of the proper parties they are termed OK sheets (that is a sheet which is selected as the standard of quality for the rest of the press run) and when such sheets are produced the press is said to be properly set. But it is well-known that print quality will not remain constant over a long run unless said quality is continuously measured and adjustments made on the press to compensate for any changes noted. By the usual method the pressman simply evaluates print quality by making a visual examination of the press sheet image. His evaluation is a comparative one made against the OK sheet and his experience in judging allowable tolerances in the match for quality. This method is quite unsatisfactory since it relies completely on the opinion of a single observer and often this evaluation will differ widely from the opinion of the average observer or consumer. Such quality evaluations not only vary considerably from person to person but they cannot be expressed accurately in numerical values which are necessary for efficient quality control. Lithographers can produce good quality now but they cannot do it consistently and economically.

The studies which I have made indicate that there are at least three principal factors that affect the quality of a lithographic image. They are graininess, sharpness and tone reproduction. The term graininess is used to denote a sandy or rough appearance in what should be smooth, even tones. Lithographic grain looks somewhat like photographic grain but is physically different. The dots in a lithographic halftone have a regular pattern and by themselves will not give the impression of graininess. It is only when a random or scattered pattern of black (ink) and white (paper) specks or grains is superimposed on the halftone pattern that graininess becomes apparent. As in photographic grain, you usually cannot see the individual black and white grains but instead they are seen as roughness patterns. Somethimes they appear as tiny swirls, waves or mounds and often cause what should appear as a smooth even tone area to look like a forest in an aerial photograph. Some types of grain give an impression of vague, wavy forms that shift around on the sheet when viewed from different angles. The term graininess is here meant to apply only to irregular patterns that are scattered or random from one dot to the next so that the patterns themselves do not represent any particular object or thing. The maximum size grain is one unit dot area of the halftone screen and anything larger than this is considered to be a different type of image defect. My studies have clearly indicated that variations in graininess, as above defined, lower the quality of the sheets in a press run, and that the development of a method of measuring print quality necessitates the development of a method of measuring graininess.

Image sharpness refers to the impression an observer receives when examining the boundaries of well-resolved elements of detail in a press sheet. If the resolution of detail in the halftone image exceeds the limits of the eye, then the sharpness impression will depend upon how abruptly the density changes across the boundaries. In halftone printing this effect is sometimes referred to as crispness of detail. My studies have also shown that the maintenance of satisfactory print quality throughout a press run requires the proper amount of sharpness of the image and that a method which is to measure print quality effectively should include a method of measuring image sharpness.

The third factor which I found to have a significant effect on print quality is tone reproduction. A tone reproduction curve describes the visual relationship between the tone values of corresponding areas of the original and the press sheet in terms of reflection densities. Such a curve is a plot of the reflection densities of the press sheet against those of the original and in the ideal situation it would show that the reflection density of an area on the print was equal to the reflection density of the corresponding area on the original. Whether or not this ideal suitation can be achieved in lithographic printing my studies have shown that a change in this curve (i.e. a variation in the tone reproduction of the press sheet from the tone reproduction of the OK sheet) will be accompanied by a change in print quality and a method of measuring quality should include a method for measuring tone reproduction.

Using the term quality to refer to a measurement of how closely a reproduction compares with the OK sheet I have found that a group of average observers will agree when observing a series of sample prints of the same subject as to which are of the higher quality. I found that by varying graininess, sharpness and tone reproduction there would result a corresponding variation in quality as measured subjectively by a group of average observers. I prepared a series of sample prints in which two of the above three factors were maintained constant and one factor was caused to vary considerably. A group of observers was then asked to rate the sample prints in terms of the variable factor and in this manner I obtained a series of prints which were rated as to their graininess, a second series of prints which were rated as to sharpness, and a third series of prints rated as to tone reproduction.

If an automatic method of measuring these three print quality factors could be developed such that the measurements could be made rapidly while the press was operating and such that the measurements obtained would correspond closely to the subjective measurements made by the observers, then such method could be used to indicate to the pressman when the print quality of the press sheets failed to conform with the quality of the OK sheets so that press adjustments are necessary. Such a method would also indicate to some extent the particular adjustments needed since it would indicate which of the print quality factors was varying so as to bring about the change in overall print quality.

One object of this invention is to devise an objective, physical method of measuring image graininess during the operation of a lithographic press which method does not depend upon the judgment of a human observer but which produces measurements which give a good prediction of how the average observer would evaluate the image as to graininess.

Another object of this invention is to devise an objective, physical method of measuring image sharpness during operation of a lithographic press which method does not depend upon the judgment of a human observer but which produces measurements which give a good prediction of how the average observer would evaluate the image as to sharpness.

Still another object of this invention is to devise an objective, physical method of measuring image tone reproduction during operation of a lithographic press which method does not depend upon the judgment of a human observer but which produces measurements which give a good prediction of how the average observer would evaluate the image as to tone reproduction.

A further object of this invention is to devise a method of measuring print quality which will not only indicate a change in print quality but will indicate which one or more of the print quality factors is causing the change in print quality and thus aid in determining what particular adjustments on the press are needed.

A still further object of this invention is to devise a method of measuring print quality which will produce such measurements rapidly with little or no computation by the press operator.

A still further object of this invention is to devise a method of measuring print quality which consists in measuring three print quality factors from OK sheets, constructing quality control limits from these measurements and continuously measuring the same print quality factors from the press sheets in a manner such that it can be readily seen whether the latter measurements are within said control limits.

Other objects and advantages of this invention will be apparent from the following description of a preferred embodiment thereof, taken together with the accompanying drawings, in which:

FIG. 1 is an enlarged view of a section of a 70%, 150 line per inch, tint strip transparency.

FIG. 2 is a schematic diagram of the instruments used in this method for print quality control.

FIG. 3 is a diagram of the scanner head of the densitometer.

FIG. 9 illustrates four different tone reproduction curves.

FIG. 10 illustrates a chart as recorded by chart recorder 15 in FIG. 2 and shows the upper and lower granularity control limits, UCL and LCL, and the acutance control line which is shown as a horizontal, dashed line.

FIG. 11 is similar to FIG. 10 but has the granularity and acutance control lines shown at lower values.

FIG. 12 illustrates a chart as recorded by chart recorder 17 in FIG. 2 and shows the upper and lower tone reproduction control limits, UCL and LCL, marked on the chart.

Figure 4:
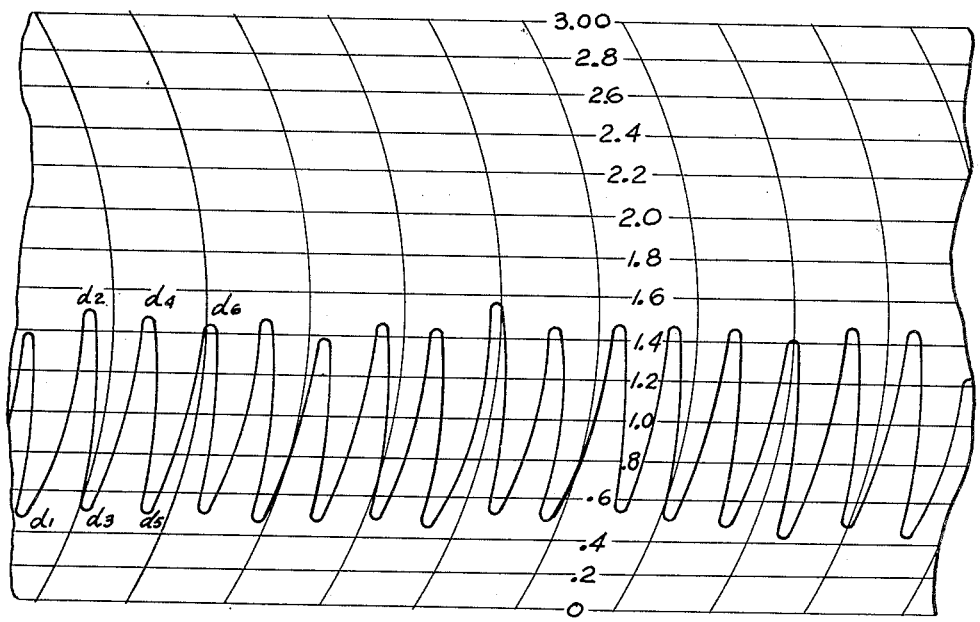
FIG. 4 is a reproduction of a chart recording of the densitometer signal recorded during the scanning of a press sheet image of the tint strip.

Measurements of the print quality factors are made from a line screen tint strip which is printed on an area of the press sheet which is trimmed away as waste, thus being known as the trim area. The line screen tint strip here used is composed of alternate black (ink) and white (paper) lines the ratio of black to white line widths being 70:30, that is, a 70% line tint. FIGURE 1 shows an enlargement of such a line tint, the strip actually being ⅛ to ¼ inch wide and several inches long and having 150 equal black lines and 150 equal white lines to the inch. The line screen tint strip is placed on the press plate alongside or nearby the halftone that is to be measured. This strip may be placed on the plate cylinder either parallel to the cylinder axis or at 90 degrees to such parallel position and the lines in the tint strip should preferably be at an angle of 45 degrees to the cylinder axis. On a large press sheet the tint strip may be placed either parallel to the cylinder axis or in the around-the-cylinder direction at several places across the cylinder.

After the press impression the press sheet images, 11, of the tint strips are scanned with the photo-electric scanner, 12, of a densitometer, 13, as shown in FIGURE 2, the direction of travel of the scanner being preferably at 45 degrees to the lines in the tint strip and at a scanning speed commensurate with the frequency response characteristics of the densitometer and associated circuits. In actual practice the scanner head could be stationary and the tint strip image be pulled past the scanner by the rotating press cylinder or after the press sheet with the tint strip image has left the rotating press cylinder it can then be drawn past a stationary scanner head at any suitable speed. When the scanning speed is less than the linear velocity of the sheet on the press it may be necessary to scan only every fifth or every tenth sheet. FIGURE 3 illustrates the standard optical arrangement in the scanner head. The tint strip image is indicated at 1. There is shown a photo-tube 2, diffuser 3, field stop 4, objective lens 5, and the projected image of the field stop opening at 6. Also shown in FIGURE 3 are the lamp 7, filament 8, condenser lens 9 and the defocused image of the lamp filament at 10. The optical arrangement illustrated in FIGURE 3 is standard and a detailed explanation is not deemed necessary for a description of this invention. The size of the scanning spot 6, is determined by the size of the field stop 4, and in this embodiment the diameter of the scanning spot is maintained at 0.003 inch diameter. A filter, 12, can be added between the photo-tube and the field stop so as to enhance the density differences between the white paper and the ink film. When black ink is being used a filter is not normally necessary but with other inks a filter may be desirable.

In practice a considerable range of line width ratios, screen rulings, screen angles and scanning spot diameters may be standardized upon besides those described above. The 150 line, 70% line tint is used in this embodiment because this screen ruling is near the average used in most lithographic work, the 70% tint value is easy to print, it produces a more pronounced grainy appearance than lighter tints containing the same amount of grain, and the line tint does not produce a moire pattern when scanned by the recording densitometer.

As the scanner head of the densitometer travels along the tint strip the fluctuations in light intensity in the field stop opening are converted by the densitometer circuit into an electrical signal, the voltage of said signal being logarithmic with respect to the light reflectances along the tint strip.

Figure 5:
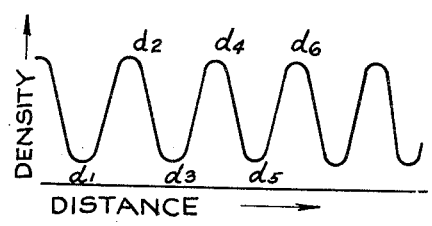
FIG. 5 illustrates a typical density curve taken from a print containing little or no graininess.

The densitometer shown at 13 in FIGURE 2 must be of a type such that the output is logarithmic with respect to the percent reflectance and in the embodiment being described the photocell and amplifier circuit of the standard Ansco Color densitometer model 12 is used. An adapter circuit was added to this standard densitometer so as to increase the strength of the normal signal but since the use of such a bucking circuit to increase signal strength is well-known, a detailed explanation of this modification is not deemed essential in describing this invention. If the output signal of the densitometer were recorded on a chart it would be a sine-wave shaped density curve such as that shown in FIGURE 4. Three successive valleys on this curve are shown at $d_1$, $d_3$, and $d_5$ and three successive peaks on this curve are shown at $d_2$, $d_4$, and $d_6$. The peaks and valleys of this curve are rounded rather than square due to the smoothing effect caused by the finite size of the scanning spot. From such a density curve one could then construct a curve showing the variations in adjacent peak-to-valley values. Thus in FIGURE 4 the value $d_2$—$d_1$ is a peak-to-valley value. The next peak-to-valley value is $d_3$—$d_2$ and the third peak-to-valley value is $d_4$—$d_3$, etc. I am here interested only in absolute differences and plus and minus signs are ignored. If the sine-wave shaped density curve were symmetrical such as the one shown in FIGURE 5 then the peak-to-valley values would all be equal and a plot of adjacent peak-to-valley values would appear as a horizontal straight line, $\overline{G}$, such as that shown in FIGURE 6. If on the other hand the density curve were irregular such as that shown in FIGURE 7 then a plot of the adjacent peak-to-valley values would show a curve such as that in FIGURE 8 which fluctuates about an average value, the dashed line $\overline{G}$.

In this method rather than actually computing these peak-to-valley values the signal from the densitometer is fed through a high impedance peak-to-peak reading vacuum tube voltmeter circuit indicated at 14 in FIGURE 2. This voltmeter circuit is designed to measure the peak-to-valley (usually called peak-to-peak in electrical terminology) voltages for both sine waves and complex waves, and it is connected to a chart recorder shown at 15 in FIGURE 2 which makes a record of its output. Thus the peak-to-peak reading voltmeter converts the alternating current component of the densitometer signal into a signal the voltage of which is a measure of the adjacent peak-to-peak variations of the densitometer signal and it thus functions as an analog computer in continuously computing these variations as they occur, said variations being recorded on a graph by the chart recorder 15 in FIGURE 2. This chart recorder will be recording a curve such as that shown in FIGURE 6 if the peak-to-peak values are constant and a curve such as that shown in FIGURE 8 if variations are present. Any standard vacuum tube voltmeter circuit having the above mentioned characteristics can be used and in this embodiment I use the A.C. section of the R.C.A. Electronic Meter type WV-97A.

By experimentation with halftone images I found that graininess was always accompanied by variations in the density gradients of adjacent black and white dots. This density gradient is the average rate of change in density while scanning from a white dot to a black dot. In making scans across the dots in a constant dot size halftone tint image I found that if the density gradients across a series of alternate black and white dots remain constant there is no sensation of graininess, and it is only when the density gradients do not remain constant but vary in a random manner that an observer becomes aware of graininess. By further experimentation I found that the variations in the output of the voltmeter shown at 14 in FIGURE 2 as recorded by the chart recorder at 15 indicated the amount of graininess of the image, and that this was true even though a line screen tint strip was used rather than a halftone.

Figure 6:
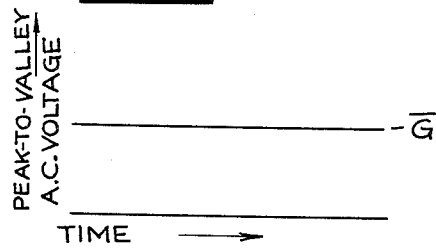
FIG. 6 is a graph of the peak-to-valley values taken from the density curve of FIG. 5.
Figure 7:
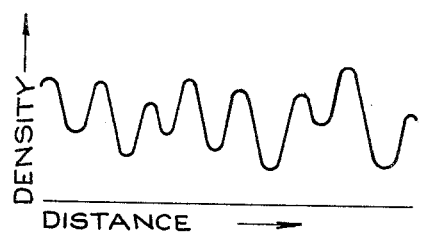
FIG. 7 illustrates a typical density curve taken from a print containing a measurable amount of graininess.

With little or no graininess present the chart produced by the recorder 15 in FIGURE 2 will appear as the curve shown in FIGURE 6, that is, a horizontal, straight line. As graininess appears in the image the chart will become wavy and vary about an average value as in the curve shown in FIGURE 8, the amount and frequency of departure from an average, horizontal line indicating the amount of graininess present. It may be noted here that the standard deviation of this curve about its mean value can be shown mathematically to be related to the standard deviation of the density ranges of adjacent sets of black and white lines in the tint strip. When graininess is measured subjectively by a group of observers it is referred to as graininess and when measured by an instrument as now being described it is herein referred to as granularity. I found by experiment that the measurements of granularity by the above method correspond closely to the measurements of graininess made by visual observation of the image by a group of observers. In other words I tried different ways of measuring what caused this graininess, using the recording densitometer, until I found the above method which graded the samples in the same order as the observers.

Figure 8:
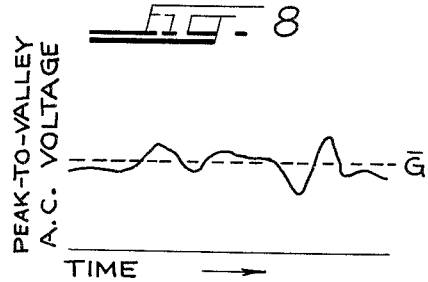
FIG. 8 is a graph of the peak-to-valley values taken from the density curve of FIG. 7.

It is possible, of course, to assign numerical values, in terms of the standard deviation, to the variations about the average line in FIGURE 8 so as to make numerical measurements of the amount of graininess in the press sheet by measuring objectively the amount of granularity in the tint strip image in the trim area of said press sheet. More important, however, is the fact that the above method for obtaining granularity measurements has been adapted for use in quality control. In quality control it is necessary to know both the graininess values of the standards as well as any variations in the graininess of the work being produced by the press. For example, at the start of a press run it is necessary to know what the graininess value in the press sheet halftone should be. By measuring the OK or standard sheet we can determine the range within which the voltage curve produced on the chart recorder 15 should be contained when the process is under statistical control. The method involves the use of control limits which are marked right on the chart as will be more fully explained later.

I have found that image sharpness can be evaluated in a manner similar to that used for graininess. I found that the average of the peak-to-valley density values between adjacent black and white lines or dots in a fine screen ruling is a physical correlate to image sharpness. Thus in FIGURE 4 if the values (ignoring signs) $d_1$—$d_2$, $d_2$—$d_3$, $d_3$—$d_4$, $d_4$—$d_5$, etc. are averaged then said average peak-to-valley value is a measure of image sharpness. When sharpness is measured subjectively by a group of observers it is referred to as sharpness but when it is measured by an instrument it is herein referred to as acutance. Since the curve in FIGURE 8 (which is a more detailed view of chart 1 from chart recorder 15 in FIGURE 2) is a plot of peak-to-peak voltage differences across the density curve it follows that a horizontal straight line which is an average of the values recorded on chart 1 will be a measure of acutance. I found by experiment that measurements of acutance made in this manner agreed closely with the measurements of sharpness made subjectively by a group of observers. Thus in this method the curve on chart 1 serves two purposes in that its variations from an average, horizontal line are a measure of granularity and its average height is a measure of acutance. Here too the method is adapted to quality control by marking an acutance control line on the chart as will be more fully explained later.

The voltage signal from the densitometer was also utilized so as to give information on a third print quality factor, i.e. tone reproduction. A tone reproduction curve is a plot of the reflection densities of the press sheet against those of the standard such as is shown in FIGURE 9. Density measurements for construction of a tone reproduction curve can be calculated as follows: The light reflectance, R, of an area A which includes several halftone dots is first averaged and then converted to density. (The density of such an area is equal to the negative logarithm of the integrated reflectance of that area and is not equal to the average of the densities of the elements which make up the total area.) If we call integrated density I.D. then $$I.D. = -\log R = -\log \frac{1}{N}\sum_{i=1}^{N} r_i$$

Where R is the average reflectance of the area A and $r_1$ is the reflectance of a small element of A such that $$a = \frac{A}{N}$$

As previously stated the densitometer is of such a type that the output is logarithmic with respect to reflectance and if $\overline{V}$ is used to denote the average direct current voltage output of the densitometer the relationship between $\overline{V}$ and reflectance is expressed as follows:

$$\overline{V} = \frac{1}{N}\sum_{i=1}^{N} -\log r_i$$

The average direct current voltage is proportional to the sum of the logs of $r_1$ and thus to the products of $r_1, r_2 \ldots r_n$ whereas I.D., the integrated density, is proportional to the sum of $r_1, r_2 \ldots r_n$. The integrated density of a constant dot size halftone tint is therefore proportional to the average direct current voltage output of the densitometer and though the relationship is not necessarily linear yet an increase in one of these quantities will always produce an increase in the other. In quality control work linearity is not essential and it is possible to use a measure for integrated density which is merely proportional to the actual value so that $\overline{V}$ can be used as a measure of any change in tone reproduction.

Referring to the curves in FIGURE 9 it should be noted that while the shape of these curves are primarily determined in the making of the halftone transparency, they are also influenced by the press plate, press, blanket, ink, ink film thickness and the type of paper used. For simplicity a straight line relationship between the original and press sheets was chosen for FIGURE 9. At the start of a press run a set of these conditions is selected as standard by the tone reproduction curve of the OK sheet. For example, the tone reproduction of the OK sheet might be the curve "A" in FIGURE 9. From the standpoint of quality control it is less important what the exact shape of this curve is than that it be maintained between some fixed limits throughout the press run. Any change in press conditions which would influence the tone reproduction curve such as a change in ink film thickness, will cause proportional changes throughout the curves, (for example the tone reproduction could change to line "B" in FIGURE 9) and thus in measuring a change in tone reproduction it is only necessary to locate one point on the tone reproduction curve. This can be done by measuring the integrated density of the 70% tint strip image on the press sheet. In other words because of the fixed dot size relationships on the press plate one can use a density measurement on one size of dots to predict density changes for other dot sizes along the tone reproduction curve, the changes in density being least for the highlight dots and greatest for the shadow dots. Furthermore, these density changes are similar for both halftone and line tints of the same screen rulings so that the same tint strip used for measuring granularity and acutance can be used for tone reproduction measurements.

With the mathematical relationship between density and voltage given above and by experimentation it was found that by feeding the densitometer output signal to a second high impedance vacuum tube voltmeter, indicated at 16 in FIGURE 2, the output of voltmeter 16 would give a measure of the integrated density of the 70% line tint strip image and that said value would further be a measure of tone reproduction which would agree closely with the subjective measurements of tone reproduction made by a group of observers. The circuit in the voltmeter 16 in FIGURE 2 should be such that it integrates or averages the D.C. voltages over two or more lines of the tint strip so that its output is the analog of the average direct current voltage V from the densitometer signal, and in this embodiment the D.C. section of the R.C.A. Electronic Meter, type WV-97A is used. This D.C. section was modified only in that a standard 0.15 microfarad condenser was added between the grid of the tube and the ground in order to reduce the pulse response speed of the circuit. The output of this voltmeter 16 is fed to a chart recorder 17 which produces chart No. 2. Here too control limits can be obtained from the OK sheets at the beginning of a press run and can be marked on chart No. 2 so that the pressman can tell at a glance if his press sheets are getting out of control with respect to tone reproduction, i.e. if the integrated reflection density of the 70% tint strip image on the press sheet has varied considerably from that of the 70% tint strip image on the OK sheet.

FIGURE 2 shows in block form the instruments used for this method. The tint strip 11 is shown in a trim area of the press sheet 18. The scanner head 12 of the densitometer is connected by cable 19 to the densitometer circuit 13. The scanner head is caused to travel along the tint strip 11 by means of the lead screw 20 which is driven by the motor 21. When actually set up on a lithographic press the scanner head could be stationary on the press and the tint strip would then be pulled past the scanner by the press cylinder. The power input is fed to a voltage regulator 22 and then to the densitometer 13 through leads 23 and 24. A parallel tap is made at 25 and 26 with leads 27 and 28 to supply power to the voltmeter 14 and another parallel tap is made at 29 and 30 with leads 31 and 32 in order to supply power to voltmeter 16. The output of the densitometer is fed to voltmeter 14 by leads 33 and 34 and to voltmeter 16 by leads 35 and 36. Voltmeter 14 is then connected to a chart recorder 15 by leads 37 and 38 and voltmeter 16 is connected to a chart recorder 17 by leads 39 and 40. The lamp is shown at 41 with the associated condenser lens at 42 and the lead 43 connects the lamp to its power supply 44.

FIGURES 10-12 illustrate the technique used to effect quality control during a press run. At the beginning of the press run sample prints are examined by the client or someone with authority of approval and OK sheets are obtained. This OK sheet then becomes the standard against which all future press sheets during the press run are compared. Thus the charts obtained from recorders 15 and 17 (FIGURE 2) when the OK sheet was scanned just after printing indicate acceptable measurements of granularity, acutance and tone reproduction and if these print quality factors were held constant for the entire press run good quality control would be effected. However, it is not necessary that said factors be absolutely constant and thus from these charts of the OK sheets control limits are computed by methods found in any standard reference on statistical quality control. That is, the curves in charts 1 and 2 may be considered as sections of a stationary time (or distance) series and the mean values and standard deviations about the mean values are then computed. Upper and lower control limits about the mean values are computed from the standard deviations according to the fineness of control desired. Markers indicating these mean values and upper and lower control limits are then set on the recorders. In FIGURE 10 the lines UCL and LCL represent the upper and lower control lines for granularity. The recorded curve shown in FIGURE 10 represents the output of voltmeter 14 as recorded by chart recorder 15 (FIG. 2) during a scan by the densitometer across the tint strip image on the press sheet. The statistical nature of the control limits for granularity is such that just a few peaks and valleys of the recorded curve of each press sheet should exceed these limits if the sheet is similar in graininess to the OK sheet.

The dashed horizontal line in FIGURE 10 is the acutance control line and represents the average height of the curve recorded by recorder 15 (FIG. 2) from the OK sheet. As with granularity the pressman can tell by a quick, visual examination of FIGURE 10 if the acutance, the average value of the curve from his press sheet images, is drifting away from his OK sheet. He does this by estimating if the average value along the curve is showing a significant upward or downward trend. If a more precise measurement is necessary the curve values at several random or equally spaced points can be average. Since the average value of the curve in FIGURE 10 is approximately coincident with the dashed acutance control line and since only a very few peaks on the curve exceed the granularity control limits such a curve would indicate to the pressman that his press was running properly with respect to sharpness and graininess.

FIGURE 11 shows a chart where the selected control limits from the OK sheet were lower than in FIGURE 10 and the curve in this case shows that a considerable number of peaks in the curve are above the upper control limit and also the horizontal line A which represents the average value of the curve is considerably above the horizontal dashed line which represents the acutance control line. A chart of this type would warn the pressman that his press was out of control. It further tells him that since the sharpness value has increased he is probably running too much ink. The ink lines marked $x$ and $y$ were drawn so as to indicate, ignoring one or two exceptional peaks, the range within which the curve was contained and a comparison of the distance between these lines with the distance between the upper and lower control limits shows that they are about equal and thus the graininess has not changed significantly and it is only the sharpness that is out of control. It should be noted that upper and lower control lines for acutance can be computed and drawn on the chart if this is desired.

FIGURE 12 illustrates tone reproduction control. When OK sheets are obtained at the beginning of the press run the tint strip image on the OK sheet is scanned and recorder 17 (FIG. 2) records the integrated density of the 70% line tint strip image on said OK sheet. From that value using standard statistical control methods the upper and lower control limits for tone reproduction are computed and markers indicating them are then set on the recorder. FIGURE 12 shows a curve recorded by chart recorder 17 during a press run, the average value representing the integrated density of the 70% tint strip image on the press sheet. When the press is under control the curve should be almost completely contained between the two control limits and its average value should be approximately equal to the solid horizontal line A drawn half-way in between said control limits. In FIGURE 12 the curve is almost completely above the upper limit indicating to the pressman that the press is out of control. There can be several causes for this condition and the pressman, by referring to the granularity and acutance curves can narrow down the possible causes. For example if the granularity curve also shows an increase it indicates that the plate is scumming. If the granularity curve shows little change but the sharpness curve shows an increase, then this indicates too much ink is being fed to the plate. If the ganularity and acutance curves show little change it may indicate that the blanket is slurring.

The three figures explained above are but one illustration of how the pressman can use the charts from the print quality instrument so as to effect quality control. When the press goes out of control any one or more of the three print quality factors may change and the ability of the pressman to analyze the difficulty by examination of the charts can come from training and experience. The charts are also of value to plant management as they give a record of the quality consistency and production of each press.

This method can, of course, be applied in various ways and the present description should therefore be regarded as disclosing only an illustrative embodiment of the invention from which no unnecessary limitations should be implied.

I claim:
1. A method of measuring the granularity of halftone lithographic images which consists in printing a line screen tint strip image near the halftone to be measured, scanning said tint strip with light-sensitive means and producing a first signal which varies in a logarithmic manner with respect to the light reflectances along said strip, continuously converting said first signal into a second signal, the voltage of which is a measure of the peak-to-valley values of said first signal, and measuring the fluctuations of sa vdioltage about its average value.

2. A method of measuring the acutance of halftone lithographic images which consists in printing a line screen tint strip image near the halftone to be measured, scanning said tint strip with light-sensitive means and producing a first signal which varies in a logarithmic manner with respect to the light reflectances along said strip, continuously converting said first signal into a second signal, the voltage of which is a measure of the peak-to-valley values of said first signal, and measuring the average value of said voltage.

3. A method of measuring the tone reproduction of halftone lithographic images which consists in printing a line screen tint strip image near the halftone to be measured, scanning said tint strip with light-sensitive means and producing a first signal which varies in a logarithmic manner which respect to the light reflectances along said strip, continuously converting said first signal into a second signal, the voltage of which is a measure of the average direct current voltage of said first signal, and measuring the average value of said voltage.

4. A method of effecting quality control with respect to the granularity of halftone lithographic images which consists in: producing an OK sheet which has been found satisfactory as to granularity and which has a line screen tint strip image printed thereon; scanning said tint strip with light-sensitive means and producing a first signal which varies in a logarithmic manner with respect to the light reflectances along said strip; continuously converting said first signal into a second signal, the voltage of which is a measure of the peak-to-valley values of said first signal; measuring the fluctuations of said voltage about its average value; determining acceptable control limits for said fluctuations and marking said control limits on a chart; using the same procedure to measure such fluctuations from a similar tint strip image printed on a press sheet, the quality of which is to be controlled; and recording the fluctuations measured from said press sheet on said chart whereby said recorded fluctuations may be compared with said control limits.

5. A method of effecting quality control with respect to the acutance of halftone lithographic images which consists in: producing an OK sheet which has been found satisfactory as to acutance and which has a line screen tint strip image printed thereon; scanning said tint strip with light-sensitive means and producing a first signal which varies in a logarithmic manner with respect to the light reflectances along said strip; continuously converting said first signal into a second signal, the voltage of which is a measure of the peak-to-valley values of said first signal; measuring the average value of said voltage; determining acceptable control limits for said average voltage and marking said control limits on a chart; and using the same procedure to measure such an average voltage from a similar tint strip image printed on a press sheet, the quality of which is to be controlled; and recording the average voltage measured from said press sheet on said chart whereby said recorded average voltage may be compared with said control limits.

6. A method of effecting quality control with respect to the tone reproduction of halftone lithographic images which consists in: producing an OK sheet which has been found satisfactory as to tone reproduction and which has a line screen tint strip image printed thereon; scanning said tint strip with light-sensitive means and producing a first signal which varies in a logarithmic manner with respect to the light reflectances along said strip; continuously converting said first signal into a second signal, the voltage of which is a measure of the average direct current voltage of said first signal; determining acceptable control limits for said voltage and marking said control limits on a chart; using the same procedure to measure such a voltage from a similar tint strip image printed on a press sheet, the quality of which is to be controlled; and recording the voltage measured from said press sheet on said chart whereby said recorded voltage may be compared with said control limits.

7. A method of measuring objectively the print quality of a halftone lithographic image by measuring three print quality factors, granularity, acutance and tone reproduction, which consists in: printing a line screen tint strip image adjacent to said lithographic image; scanning said tint strip with light-sensitive means and producing a first signal which varies in a logarithmic manner with respect to the light reflectances along said strip; continuously converting a portion of said first signal into a second signal, the voltage of which is a measure of the peak-to-valley values of said first signal; measuring the fluctuations of said voltage about its average value so as to measure the granularity of said lithographic image; measuring the average value of said voltage so as to measure the acutance of said lithographic image; continuously converting a portion of said first signal into a third signal, the voltage of which is a measure of the average direct current voltage of said first signal; and measuring the average value of said third signal so as to measure the tone reproduction of said lithographic image.

8. A method of effecting print quality control of halftone lithographic images which consists in: producing an OK sheet which has been found to be of satisfactory quality and which has a line screen tint strip image printed thereon; measuring each of the three print quality factors, granularity, acutance and tone reproduction, from said OK sheet by the method set forth in claim 7; determining acceptable control limits for each of said three quality factors and marking said control limits on charts; using the method of claim 7 to produce such second and third signals from a press sheet, the quality of which is to be controlled; recording said second and third signals on said charts whereby said recorded signals may be compared with the corresponding control limits; and adjusting the press as necessary to maintain said recorded signals within said respective control limits, the adjustments being made depending in part upon which of the recorded signals has exceeded its control limits.

References Cited in the file of this patent

UNITED STATES PATENTS

| | | |
|---|---|---|
| 2,111,068 | Huebner | Mar. 15, 1938 |
| 2,321,057 | Weiss | June 8, 1943 |
| 2,339,204 | Stockbarger et al. | Jan. 11, 1944 |
| 2,569,488 | Newman | Oct. 5, 1951 |
| 2,641,158 | Sweet | June 9, 1953 |
| 2,840,721 | Frommer | June 24, 1958 |